US00RE45438E

(19) United States
(12) Reissued Patent
Kehrer et al.

(10) Patent Number: US RE45,438 E
(45) Date of Reissued Patent: Mar. 31, 2015

(54) SINK

(75) Inventors: Joachim Kehrer, Bretten-Bauerbach (DE); Katherina Pafralidou, Heilbronn (DE)

(73) Assignee: Blanco GmbH + Co KG, Oberderdingen (DE)

(21) Appl. No.: 29/396,097

(22) Filed: Jun. 24, 2011

Related U.S. Patent Documents

Reissue of:
(64) Patent No.: Des. 632,373
Issued: Feb. 8, 2011
Appl. No.: 29/334,729
Filed: Mar. 31, 2009

(51) LOC (10) Cl. ..... 23-02
(52) U.S. Cl.
USPC ..... D23/293.1
(58) Field of Classification Search
USPC ..... D23/284, 293.1, 290, 308; 4/639, 646, 4/619; D6/705
See application file for complete search history.

(56) References Cited

U.S. PATENT DOCUMENTS

| | | | | | |
|---|---|---|---|---|---|
| 2,700,100 | A | * | 1/1955 | Wissinger | 362/320 |
| 3,116,027 | A | * | 12/1963 | Kleppin | 362/410 |
| 3,763,348 | A | * | 10/1973 | Costello | 392/423 |
| 3,952,437 | A | * | 4/1976 | Mitchell | 40/720 |
| 4,162,545 | A | | 7/1979 | Hallén | |
| D351,019 | S | | 9/1994 | Moore et al. | |
| 5,507,143 | A | * | 4/1996 | Luttgeharm et al. | 60/226.2 |
| D386,336 | S | * | 11/1997 | Douglas | D6/510 |
| 5,744,218 | A | * | 4/1998 | Barnes | 428/192 |
| D394,728 | S | * | 5/1998 | Alexander | D26/118 |
| D396,911 | S | | 8/1998 | Dehavilland | |
| 5,792,246 | A | * | 8/1998 | Nishiguchi | 96/177 |

(Continued)

OTHER PUBLICATIONS

United States Patent and Trademark Office, "Notice of Allowance," issued in connection with U.S. Appl. No. 29/396,840, mailed on May 29, 2014, 29 pages.

(Continued)

*Primary Examiner* — Phillip S Hyder
(74) *Attorney, Agent, or Firm* — Hanley, Flight & Zimmerman, LLC

(57) CLAIM

The ornamental design for a "sink," as shown and described.

DESCRIPTION

[FIG. 1 is a perspective view of the sink from above;]
[FIG. 2 is a top plan view of the sink;]
[FIG. 3 is a bottom plan view of the sink;]
[FIG. 4 is a front view of the sink;]
[FIG. 5 is a rear view of the sink;]
[FIG. 6 is a side view of the sink from the right side; and,]
[FIG. 7 is a side view of the sink from the left side]
*FIG. 8 is a perspective view of the sink from above;*
*FIG. 9 is a top plan view of the sink;*
*FIG. 10 is a bottom plan view of the sink;*
*FIG. 11 is a front view of the sink;*
*FIG. 12 is a rear view of the sink;*
*FIG. 13 is a side view of the sink from the right side; and,*
*FIG. 14 is a side view of the sink from the left side.*
*The features shown in broken lines are for illustrative purposes only and do not form part of the claimed design.*

1 Claim, 14 Drawing Sheets

Figure 1:
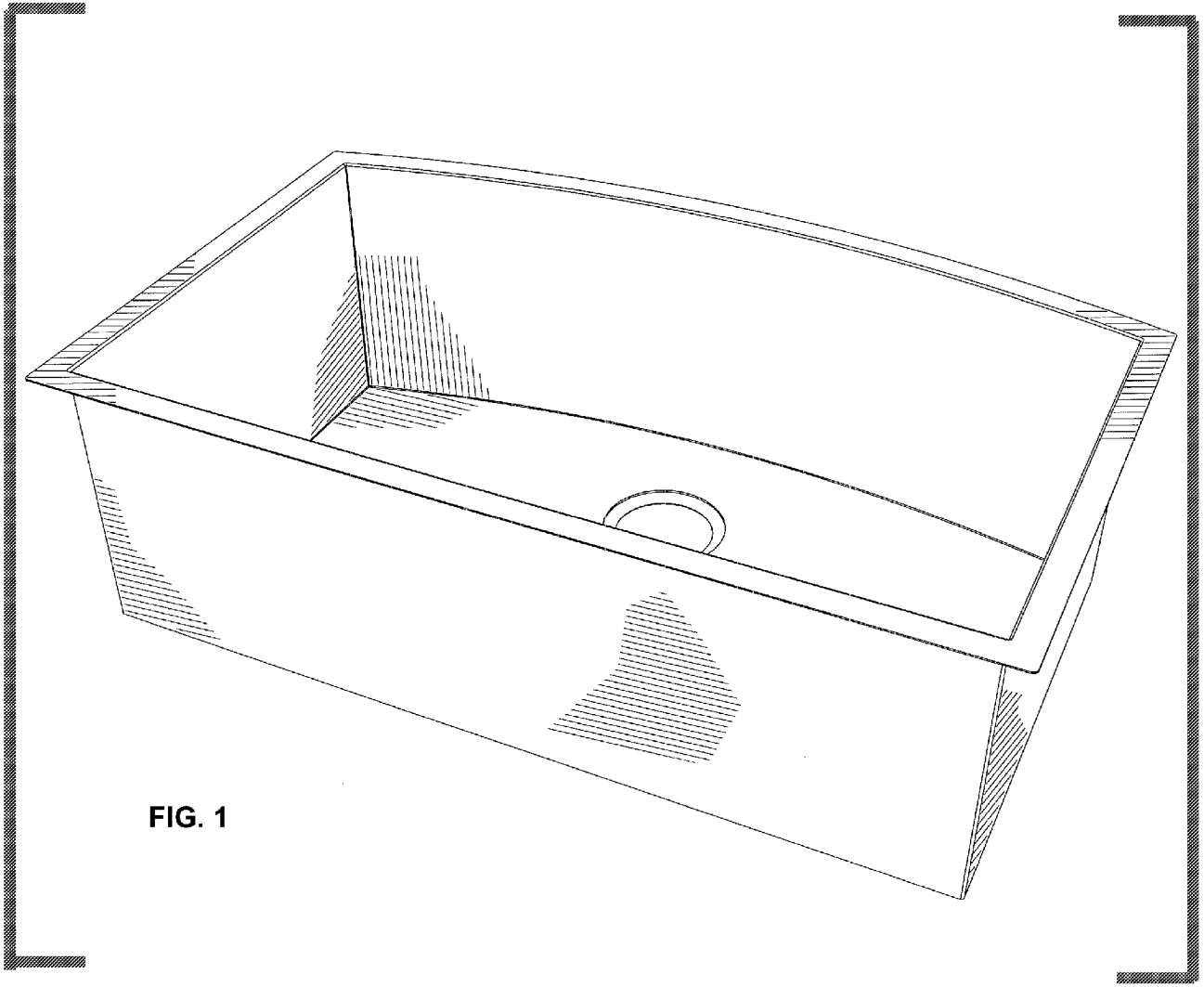
Figure 2:
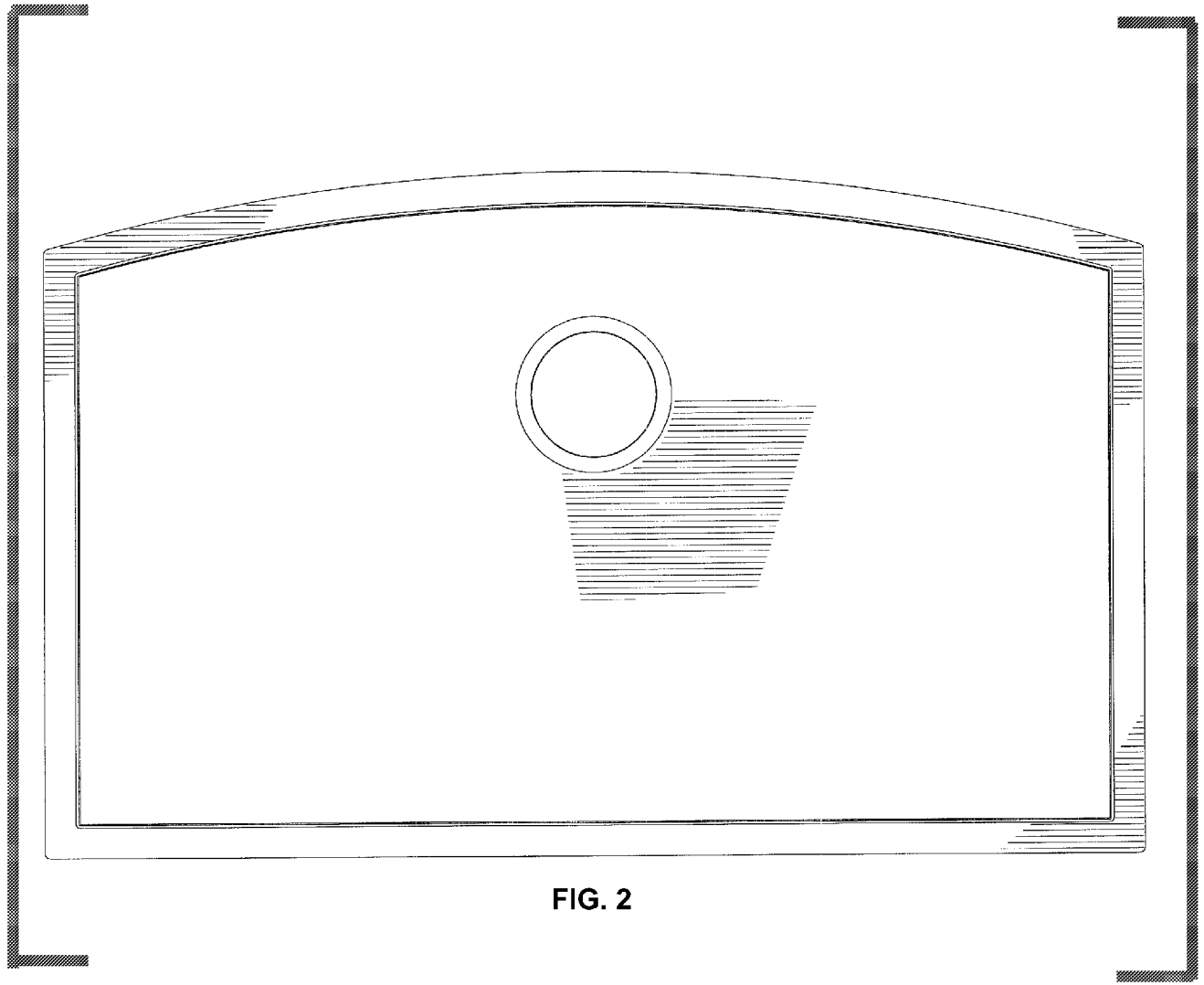
Figure 3:
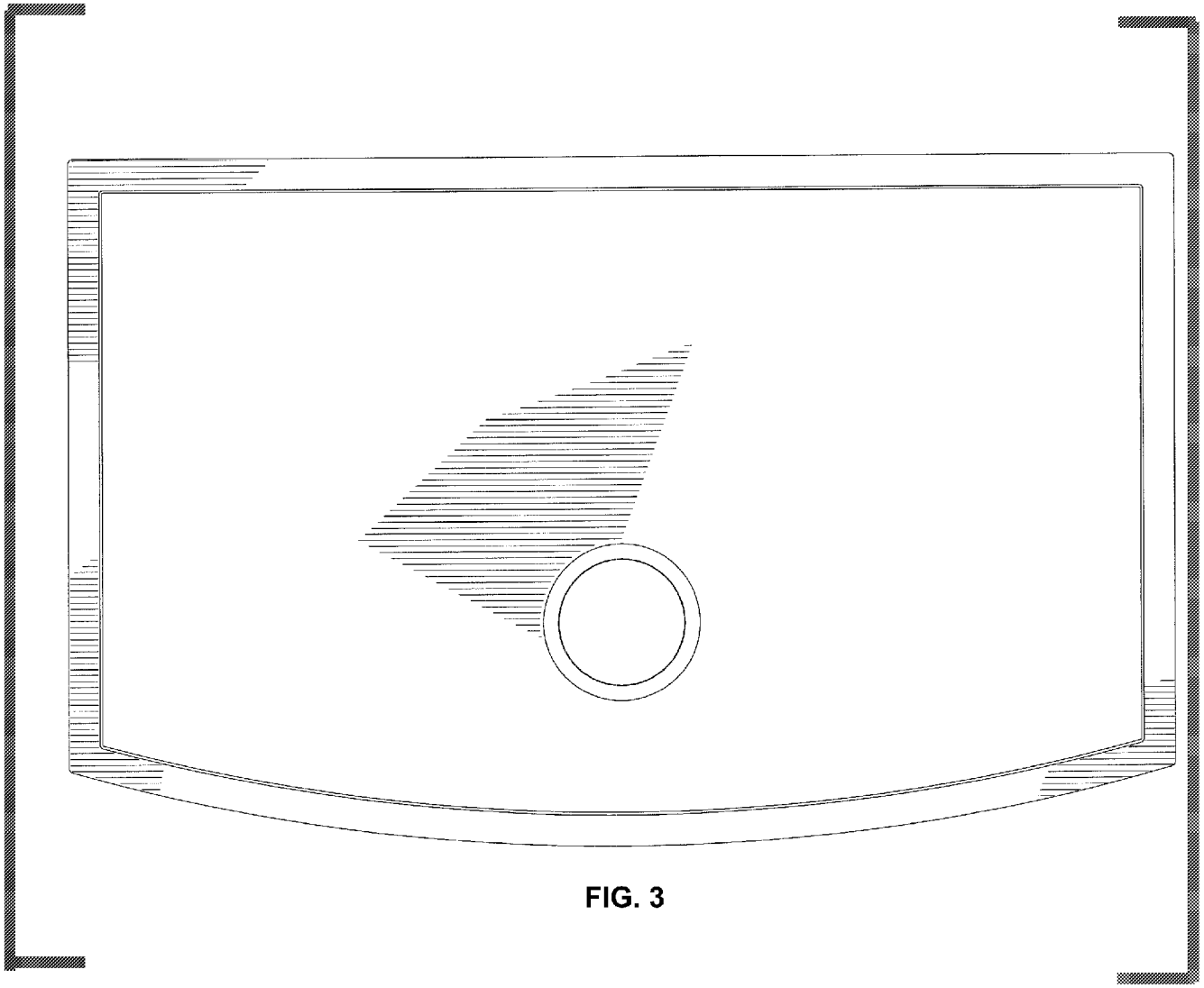
Figure 4:
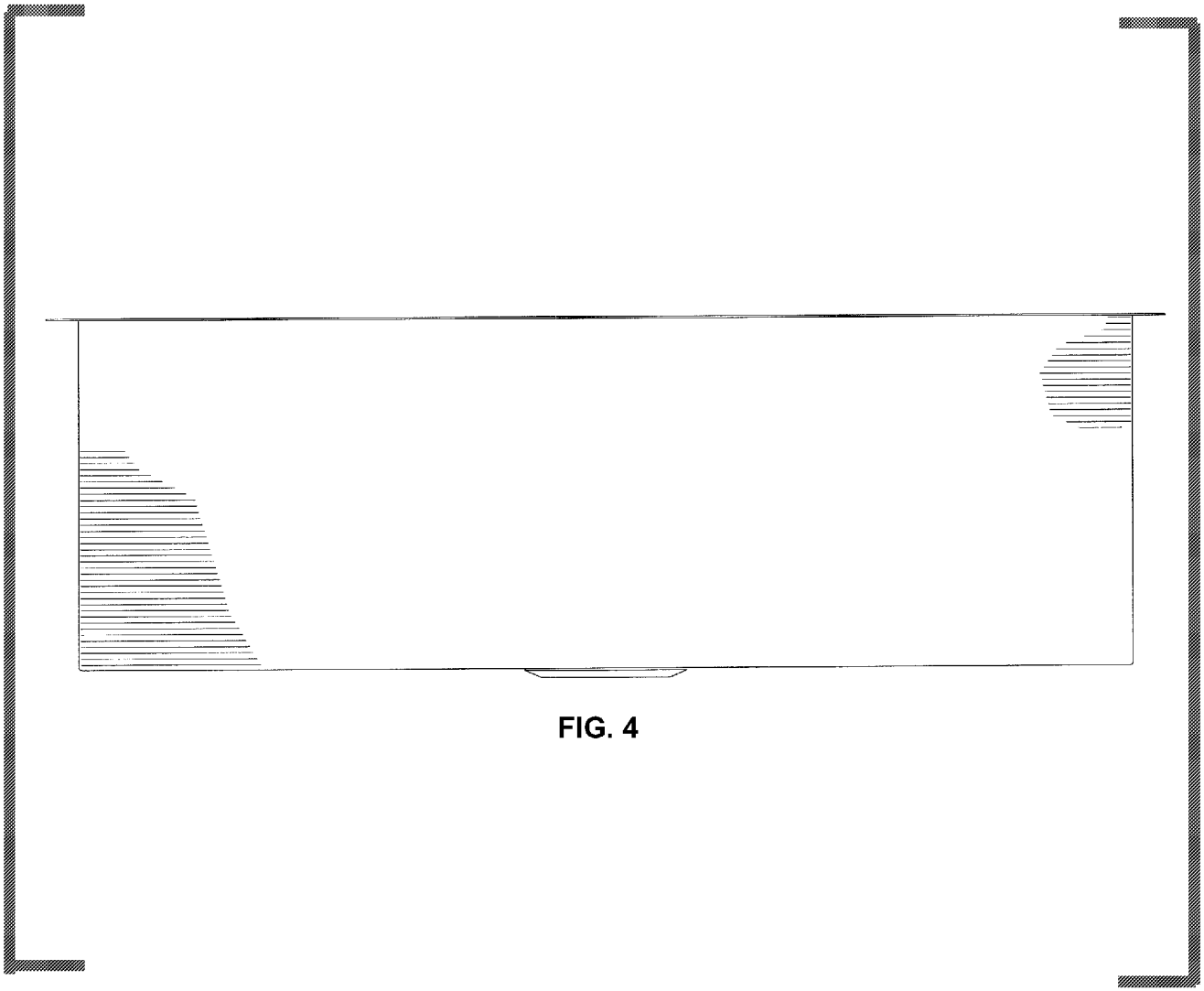
Figure 5:
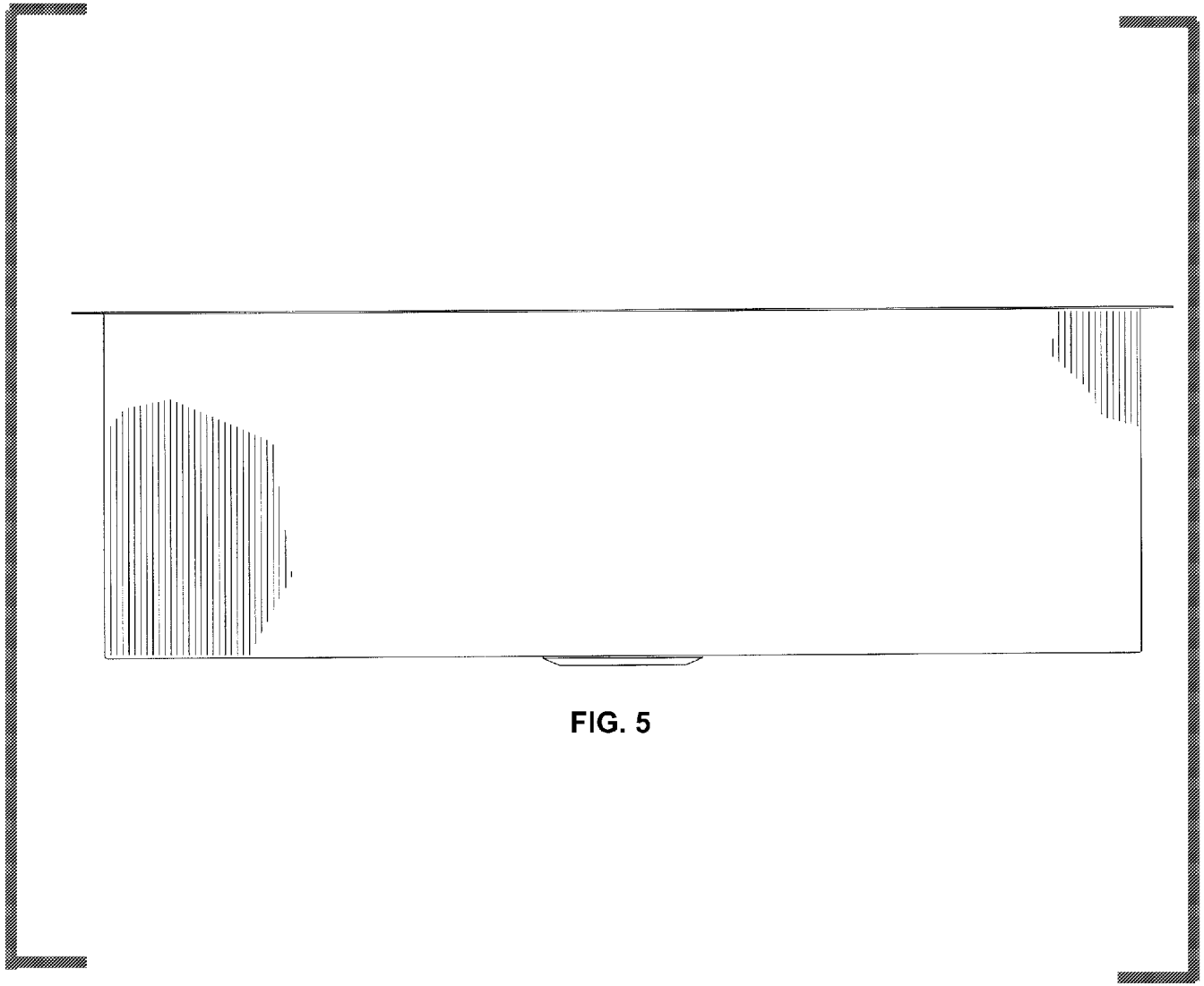
Figure 6:
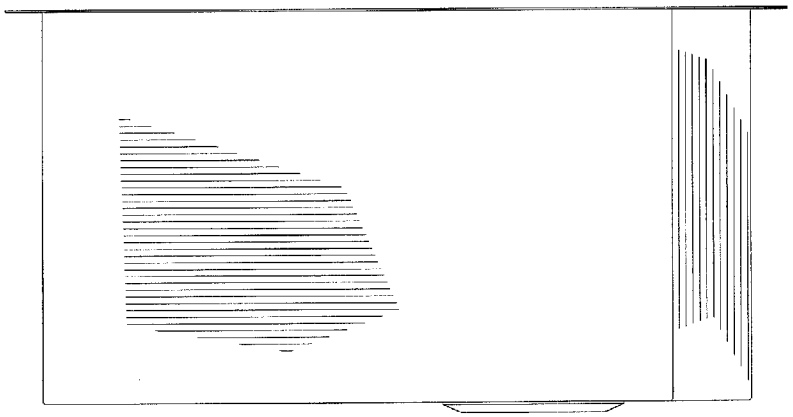
Figure 7:
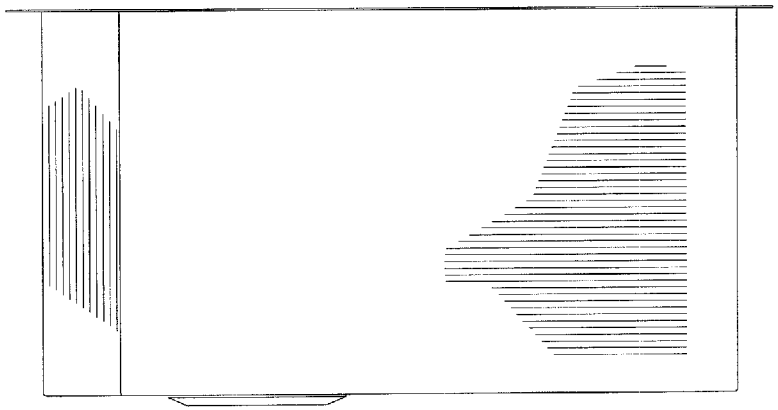
Figure 8:
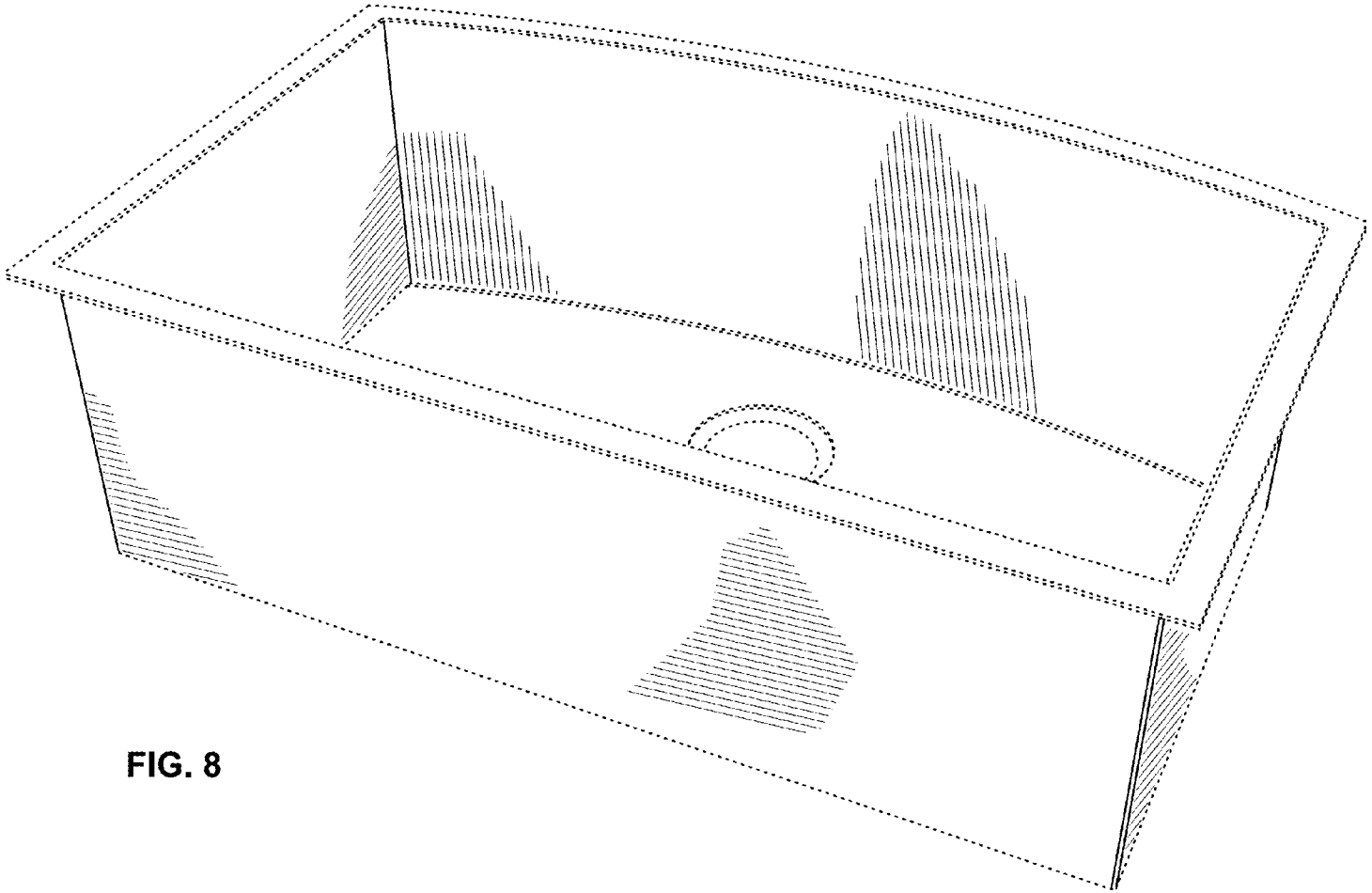
Figure 9:
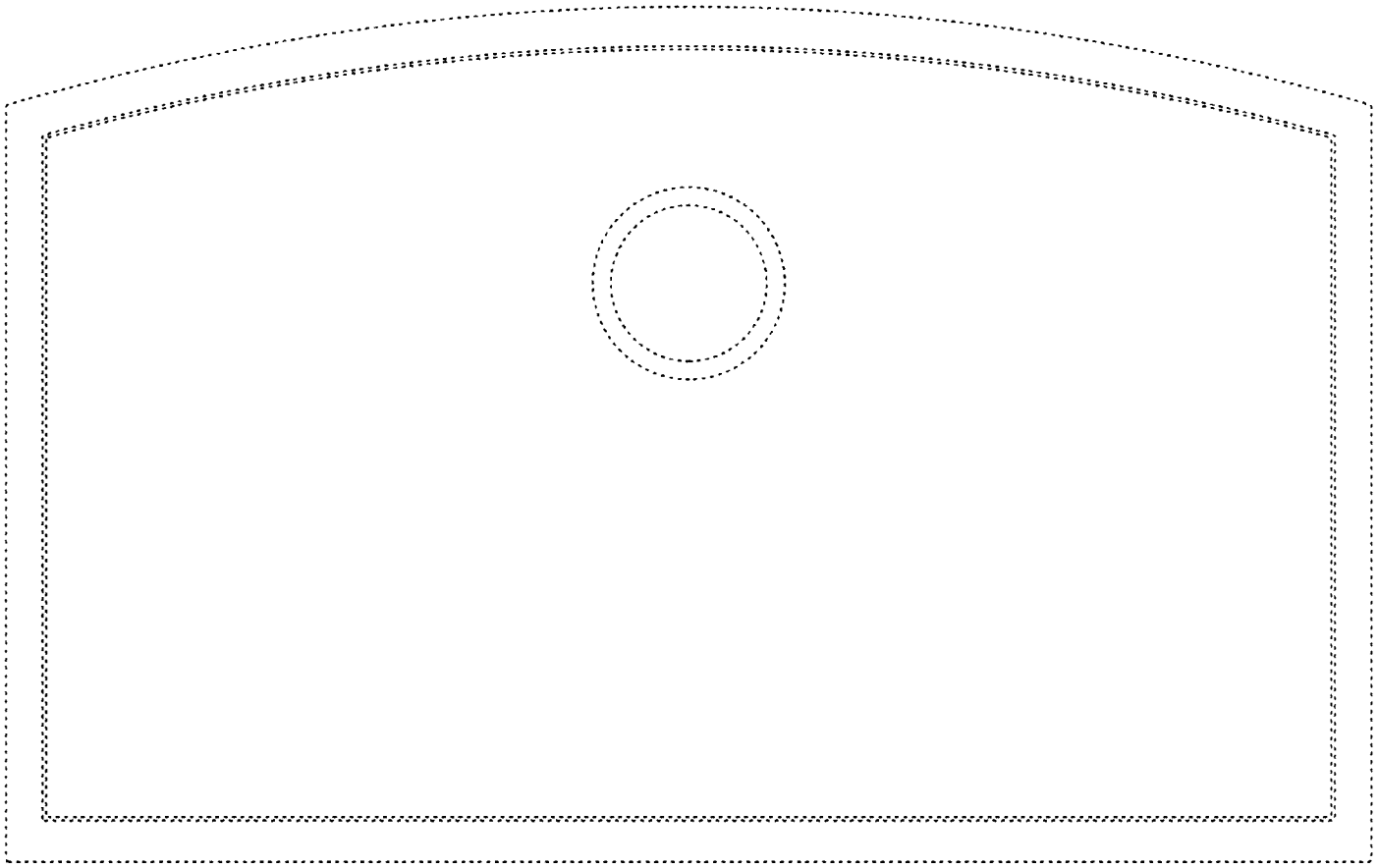
Figure 10:
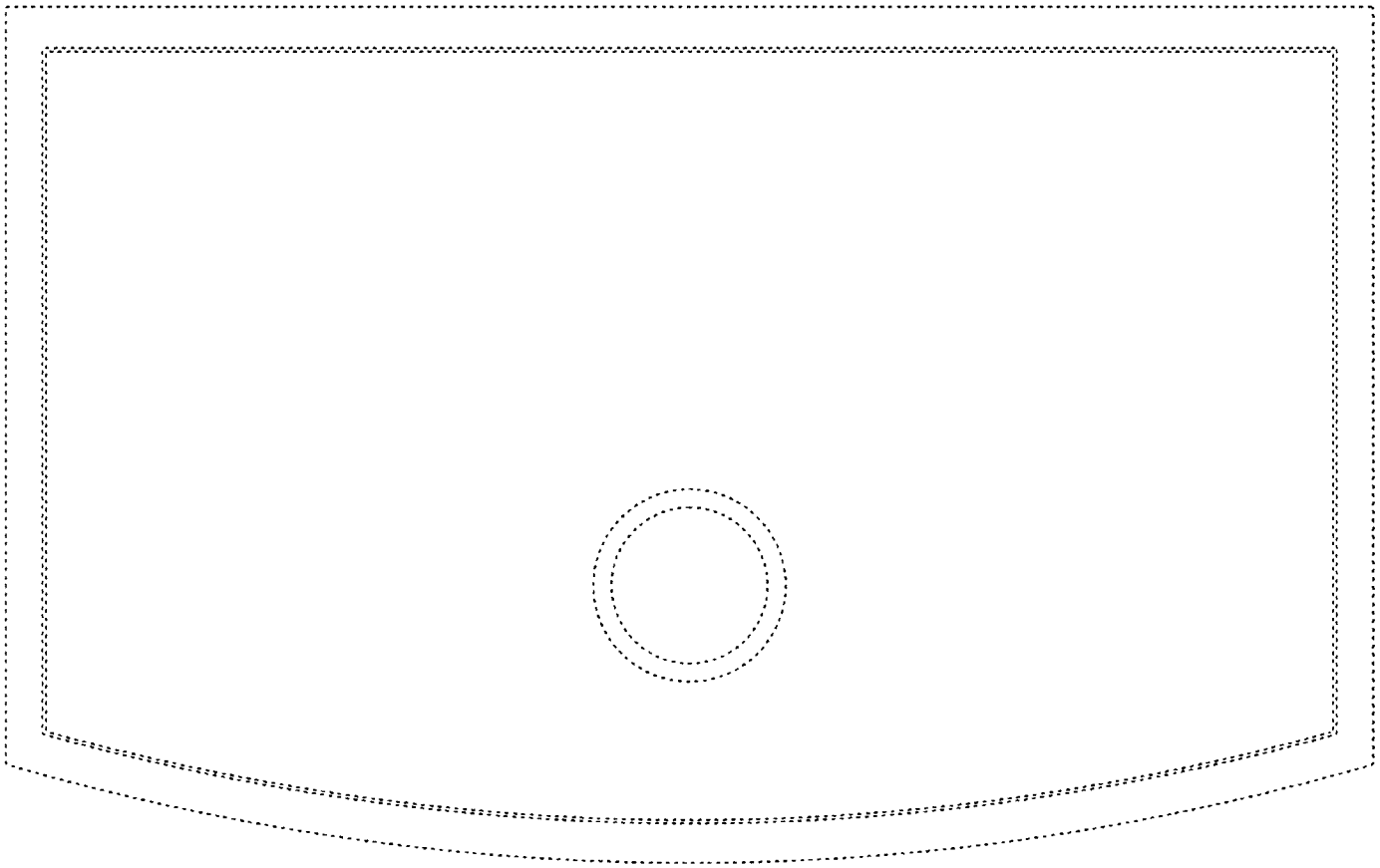
Figure 11:
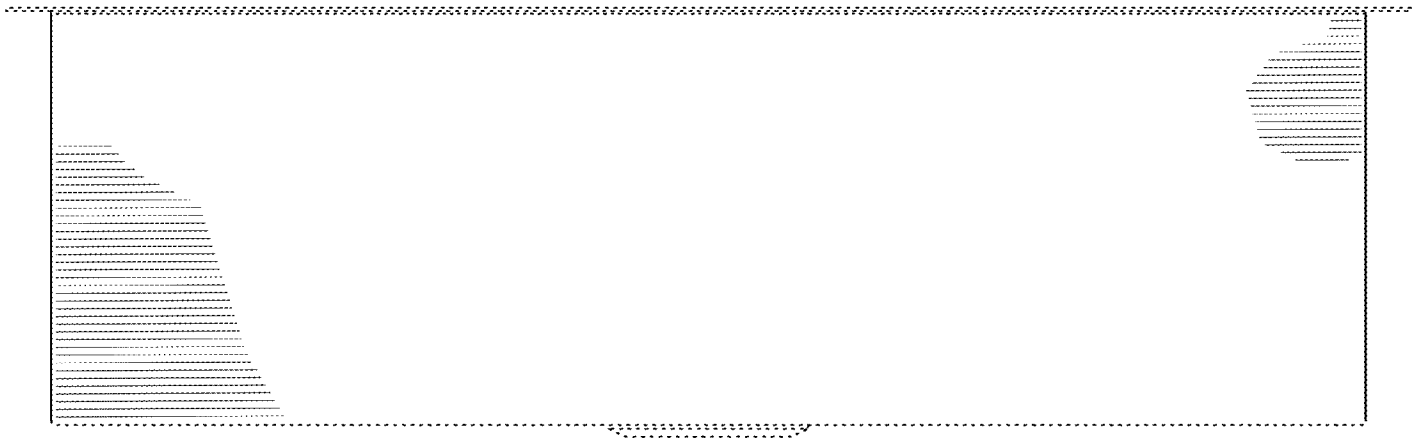
Figure 12:
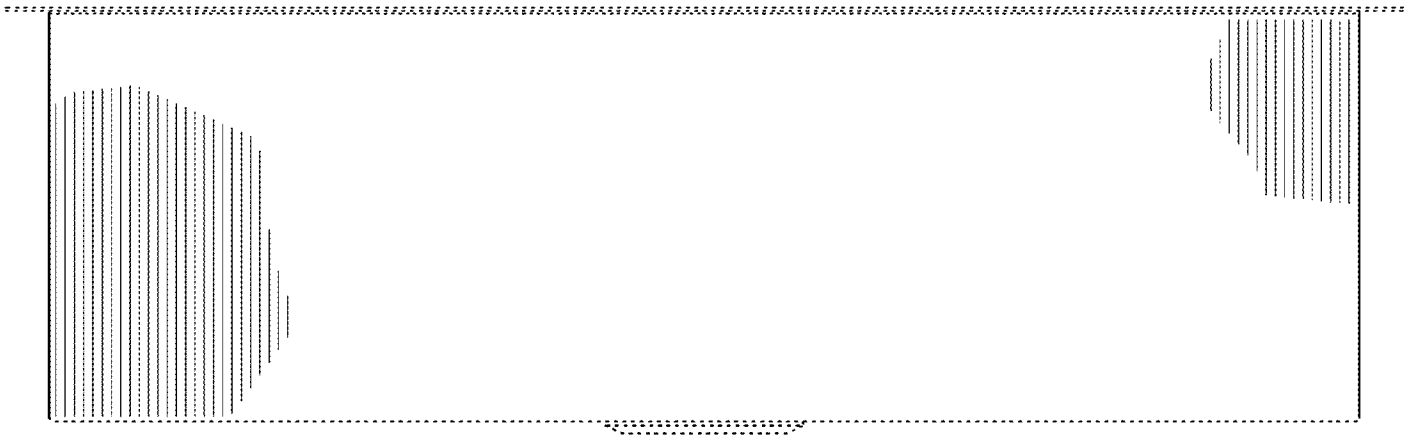
Figure 13:
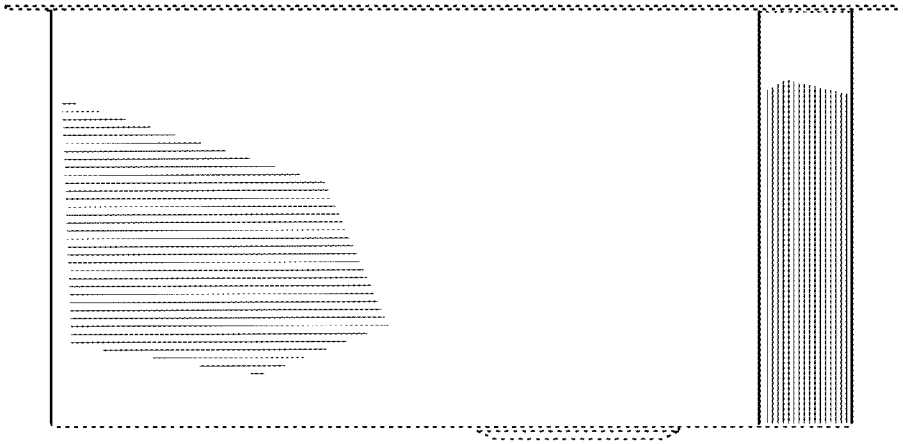
Figure 14:
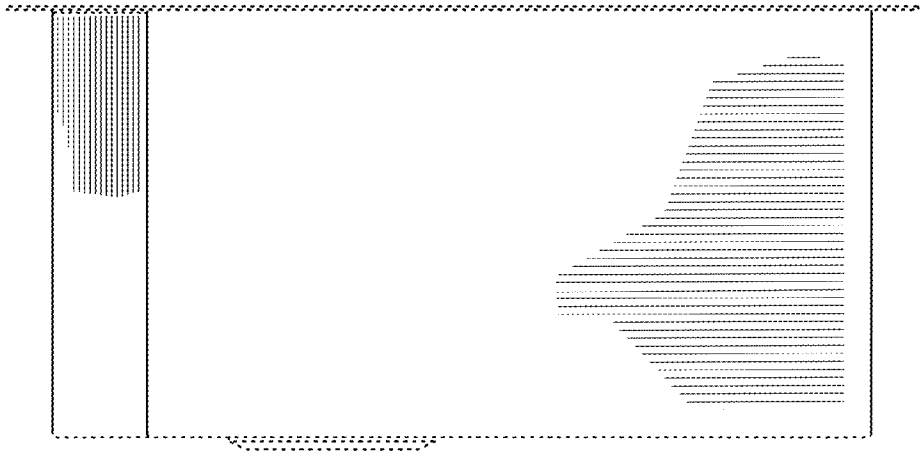

Matter enclosed in heavy brackets [ ] appears in the original patent but forms no part of this reissue; matter printed in italics indicates the additions made by reissue.

New

(56) References Cited

U.S. PATENT DOCUMENTS

| | | | | | |
|---|---|---|---|---|---|
| 5,881,404 | A | | 3/1999 | Knight | |
| D455,902 | S | * | 4/2002 | Wolf | D3/275 |
| D480,455 | S | | 10/2003 | Painter et al. | |
| D492,983 | S | | 7/2004 | Rachiele | |
| D497,417 | S | | 10/2004 | Piatt | |
| D527,808 | S | | 9/2006 | Wozniczka et al. | |
| D532,877 | S | | 11/2006 | Hisey | |
| D541,912 | S | * | 5/2007 | Ziemann | D23/293.1 |
| D544,990 | S | * | 6/2007 | Guercio | D26/118 |
| D547,841 | S | * | 7/2007 | Ziemann | D23/293.1 |
| D549,408 | S | * | 8/2007 | Lee | D32/25 |
| D549,806 | S | * | 8/2007 | Taylor | D23/284 |
| D554,241 | S | * | 10/2007 | Ziemann | D23/293.1 |
| D575,380 | S | * | 8/2008 | Ziemann et al. | D23/293.1 |
| 7,484,234 | B1 | * | 1/2009 | Heaton et al. | 725/80 |
| D596,722 | S | | 7/2009 | Hisey | |
| 7,676,971 | B2 | * | 3/2010 | White et al. | 40/606.12 |
| 7,797,868 | B1 | * | 9/2010 | Cobb et al. | 40/606.12 |
| D672,850 | S | | 12/2012 | Adams | |
| D673,203 | S | * | 12/2012 | Jacques | D16/241 |
| RE45,142 | E | | 9/2014 | Kehrer et al. | |
| 2004/0181870 | A1 | | 9/2004 | Bohacik et al. | |
| 2006/0086025 | A1 | * | 4/2006 | Benedict et al. | 40/606.12 |
| 2009/0211122 | A1 | * | 8/2009 | White et al. | 40/1 |

OTHER PUBLICATIONS

United States Patent and Trademark Office, "Non-Final Office Action" issued in connection with U.S. Appl. No. 29/396,840, mailed May 30, 2013, 10 pages.

The United States Patent and Trademark Office, "Non-final Office Action," issued in connection with U.S Appl. No. 29/396,840, dated Jan. 15, 2014, 16 pages.

United States Patent and Trademark Office, "Notice of Allowance," issued in connection with U.S. Appl. No. 29/334,729, on Sep. 24, 2010 (5 pages).

Julien, Inc., Home Refinements Specification, dated 2006, Front and Rear Covers and pp. 1-49 (53 pages total). In particular, the Vintage Collection of Undermount Sinks shown on pp. 24-26.

Blanco, Manufacturer's Suggested Price List, listing for Blanco Diamond undermount sinks, 2002, front cover, pp. 58-59, and one additional sheet (4 pages total).

Julien Inc., Vintage Collection Undermount Sinks, Undated Literature, pp. 32-36 (5 pages total).

Blanco, Black Diamond Product Literature, Undated, pp. 39-41 (3 pages).

* cited by examiner

Canceled

Canceled

Canceled

Canceled

Canceled

Canceled

Canceled

New

New

New

New

New

New

New